United States Patent Office 3,454,899
Patented July 8, 1969

3,454,899
EUROPIUM DOPED YTTRIUM OXIDE OPTICAL MASER MATERIALS
Robert A. Lefever and Nien-Chih Chang, Palo Alto, Robert L. White, Los Altos Hills, and Kenneth A. Wickersheim, Menlo Park, Calif., assignors to General Telephone and Electronics Laboratories, Inc., a corporation of Delaware
No Drawing. Filed Nov. 16, 1962, Ser. No. 238,288
Int. Cl. H01s 3/16, 1/02; C09k 1/04
U.S. Cl. 331—94.5                                4 Claims Our invention is directed toward crystalline materials and more particularly is directed toward single crystals utilizing a host material having the cubic C-type rare earth oxide structure in which is incorporated a rare earth doping ion.

In recent years, a new type of oscillator or amplifier has been developed, known as the optical maser, which provides light amplification or generation by a process of stimulated emission of radiation. The term "light" designates radiation in some portion of the infrared, visible and ultraviolet regions of the electromagnetic spectrum.

Optical masers can employ gases, liquids or solids as the active or "negative temperature" medium. We have found that our single crystals are particularly suitable for use in an optical maser.

Accordingly, it is an object of our invention to provide a new type of active medium particularly useful in optical masers.

Another object is to provide single crystals constituted by a host material having the cubic C-type rare earth oxide structure into which is incorporated a rare earth doping ion.

Still another object is to provide a new type of optical maser active medium which in contradistinction to known media, is optically isotropic, is transparent to radiation in most of the near infrared, visible and ultraviolet regions of the electromagnetic spectrum, is mechanically hard and is chemically inert.

Yet another object is to provide a new type of optical maser active medium which can be fabricated readily without being dependent upon crystallographic orientation, which is free from unwanted polarization effects, and wherein internal scattering effects due to certain types of crystal imperfections are minimized.

These and other objects of our invention will either be explained or will become apparent hereinafter.

In accordance with the principles of our invention a single crystal body which can be relatively large comprises a host material having the cubic C-type rare earth oxide structure in which is incorporated from 0.001 mole percent to about 20 mole percent of a rare earth doping ion.

Since the host material is cubic, and therefore optically isotropic, it can be fabricated easily into the conventional rod shape without requiring any particular orientation of the material with respect to any of the various crystallographic axes prior to cutting, shaping and the like. Our crystals are mechanically hard and can be polished readily. Moreover, our host crystals are transparent to radiation throughout much of the near infrared, visible and ultraviolet regions of the electromagnetic spectrum whereby a wide range of "optical pumping" sources can be used in optical masers using our crystals. In addition, the optical characteristics of our crystals are such as to eliminate unwanted light polarization effects and to minimize certain types of internal light scattering in the crystal which would otherwise inpair the electromagnetic characteristics of the generated or amplified light.

Typically the host material can be yttrium, gadolinium, lutetium, or scandium oxide. The doping ion can be, for example, one of the following rare earths: europium, neodymium, yttrium, terbium, erbium, gadolinium and cerium. Our crystals can be formed by use of the process disclosed in the U.S. Patent 3,224,840 issued Dec. 21, 1965 to Robert Lefever assigned to the assignee of this application.

Illustrative embodiments of our invention will now be described with reference to the specific example which follows:

Example

A single crystal of yttrium oxide doped with 5 mole percent of trivalent europium was fabricated into a cylinder 0.070 inch in diameter and 0.500 inch long. The ends were optically polished flat to 0.20 wavelength or better and were polished parallel to 30 seconds or better. One end was silvered to provide 100 percent reflection of visible light; and the other end was silvered to provide less than 5 percent transmission.

Four E. G. and G. Model 100 xenon lamps were arranged in a parallel configuration with each lamp defining one corner of a square. An aluminum foil was wrapped about the four lamps as a reflector. The crystal was nested within the four lamps with the axis of the crystal parallel to the axis of the lamps and to the inner surface of the reflector. The lamps were flashed from a battery of capacitors having a total capicity of 100 microfarads and a total charge of 1.3 kilovolts. A visible red flash was emitted from the partially reflective end of the rod. As measured by a spectrometer, the wavelength of the emitted light was found to be approximately 6100 angstroms. This optical maser action was repeated at low temperatures (i.e. liquid nitrogen) and at room temperature. This action was also observed as a pulse on an oscilloscope, this pulse being derived from a 1P28 photomultiplier, the burst of light being passed successively through two Kodak Wratten filters (Nos. 24 and 72B) from the rod to the photomultiplier surface.

The host materials have been defined as having the cubic C-type rare earth oxide structure sometimes also referred to as the Bixbyite structure. This type of structure is described and defined in the scientific literature as for example L. Pauling, Z. Krist. 75, 128 (1930) or in Wells, Structural Inorganic Chemistry, second edition, Oxford University Press, London, page 365, line 2–12. An error occurs in this page, line 9, wherein ". . . one-half of the M atoms . . ." should read ". . . one-quarter of the M atoms . . ."

While we have shown and pointed out our invention as applied above, it will be apparent to those skilled in the art that many modifications can be made within the scope and sphere of our invention.

What is claimed is:

1. An active medium for an optical maser which comprises a single crystal rod having optically polished ends, said ends having a light reflecting film thereon, said rod consisting essentially of a yttrium oxide host material having the cubic C-type rare earth oxide structure said oxide containing from 0.001 mole percent to about 20 mole percent of at least one rare earth doping ion selected from the group consisting of europium, terbium, erbium, neodymium, cerium and gadolinium.

2. An active medium for an optical maser in accordandce with claim 1 in which said oxide contains about 5 mole percent of said at least one rare earth doping ion.

3. An optical maser which comprises
   (a) a single crystal rod having optically polished ends, said ends having a light reflecting film thereon, said rod consisting essentially of a yttrium oxide host material having the cubic C-type rare earth oxide structure said oxide containing from 0.001 mole percent to about 20 mole percent of at least one rare earth doping ion selected from the group consisting of europium, terbium, erbium, neodymium, cerium and gadolinium and (b) an optical pumping source for supplying energy to said single crystal rod whereby said rod provides light amplification by stimulated emission.

4. An active medium for an optical maser which comprises a single crystal rod having optically polished ends, said ends having a light reflecting film thereon, said rod consisting of a yttrium oxide host material, said oxide containing from 0.001 mole percent to about 20 mole percent of europium.

References Cited

UNITED STATES PATENTS

| 3,152,085 | 10/1964 | Ballman et al. | 252—301.4 |
| 3,163,608 | 12/1964 | Yocom | 252—301.4 |
| 3,250,722 | 5/1966 | Borchardt | 252—301.4 |

OTHER REFERENCES

Kroger: Some Aspects of the Luminescence of Solids, Elsevier Pub. Co. Inc., New York, 1948, pp. 288, 289, 291, 294, 295, 296, and 297.

TOBIAS E. LEVOW, *Primary Examiner*.

ROBERT D. EDMONDS, *Assistant Examiner*.

U.S. Cl. X.R.

252—301.4; 330—4